(12) United States Patent
Dent

(10) Patent No.: US 6,873,613 B1
(45) Date of Patent: Mar. 29, 2005

(54) METHODS FOR WIRELESSLY COMMUNICATING TIME DIVISION MULTIPLE ACCESS (TDMA) DATA USING ADAPTIVE MULTIPLEXING AND CODING

(75) Inventor: Paul Wilkinson Dent, Pittsboro, NC (US)

(73) Assignee: Ericsson Inc., Research Triangle Park, NC (US)

(*) Notice: Subject to any disclaimer, the term of this patent is extended or adjusted under 35 U.S.C. 154(b) by 696 days.

(21) Appl. No.: 09/688,770

(22) Filed: Oct. 16, 2000

(51) Int. Cl.[7] .................. H04B 7/212; H04J 3/00; H04Q 7/20
(52) U.S. Cl. .................. 370/347; 370/321; 370/337; 370/442; 455/63; 455/522
(58) Field of Search .................. 370/321, 331, 370/318, 336, 337, 345, 347, 350, 441, 442, 509; 455/69, 127, 522, 561, 562, 436, 450; 342/372, 360, 450, 457

(56) References Cited

U.S. PATENT DOCUMENTS

| | | | |
|---|---|---|---|
| 4,204,093 A | | 5/1980 | Yeh .................. 370/95 |
| 4,330,857 A | | 5/1982 | Alvarez, III et al. ....... 370/104 |
| 4,686,672 A | | 8/1987 | Namiki .................. 370/95 |
| 5,267,262 A | * | 11/1993 | Wheatley, III .............. 455/522 |
| 5,345,598 A | | 9/1994 | Dent .................. 455/522 |
| 5,485,486 A | * | 1/1996 | Gilhousen et al. .......... 370/335 |
| 5,604,730 A | * | 2/1997 | Tiedemann, Jr. ............ 370/252 |
| 5,640,395 A | | 6/1997 | Hamalainen et al. ....... 370/322 |
| 5,710,982 A | * | 1/1998 | Laborde et al. .............. 455/69 |
| 5,726,983 A | | 3/1998 | Bakke et al. .............. 370/337 |
| 5,887,245 A | * | 3/1999 | Lindroth et al. .............. 455/69 |
| 5,894,473 A | * | 4/1999 | Dent .................. 370/342 |
| 5,982,766 A | | 11/1999 | Nyström et al. ............. 370/347 |
| 6,072,792 A | | 6/2000 | Mazur et al. .............. 370/345 |
| 6,330,288 B1 | * | 12/2001 | Budka et al. .............. 375/296 |
| 6,411,817 B1 | * | 6/2002 | Cheng et al. .............. 455/522 |
| 6,490,261 B1 | * | 12/2002 | Dent et al. .................. 370/337 |
| 6,529,494 B1 | * | 3/2003 | Ostman et al. ............. 370/337 |
| 6,587,690 B1 | * | 7/2003 | Di Huo et al. ............. 455/446 |
| 6,594,499 B1 | * | 7/2003 | Andersson et al. ......... 455/522 |

FOREIGN PATENT DOCUMENTS

| | | |
|---|---|---|
| EP | 0 845 916 A2 | 6/1998 |
| EP | 0 942 550 A1 | 9/1999 |
| WO | WO 97/13388 | 4/1997 |
| WO | WO 97/33402 | 9/1997 |
| WO | WO 99/18685 | 4/1999 |

OTHER PUBLICATIONS

International Search Report, PCT/US 01/42129, May 16, 2002.

Sampei et al., *Adaptive Modulation/TDMA Scheme for Personal Multi–Media Communication Systems*, Proceedings of the Global Telecommunications Conference (Globecom), vol. 2, Nov. 1994, pp. 989–993.

U.S. patent application Ser. No. 09/066,669, Dent, filed Apr. 28, 1998.

* cited by examiner

*Primary Examiner*—Man Phan
(74) *Attorney, Agent, or Firm*—Myers Bigel Sibley & Sajovec

(57) ABSTRACT

Data is wirelessly transmitted from a base station, and/or wirelessly received at a plurality of subscriber stations that are at a plurality of distances from the base station using a Time Division Multiple Access (TDMA) frame by transmitting a same amount of data to each of the subscriber stations at a same power level during the TDMA frame while varying at least one other parameter as a function of the distance of the respective subscriber station from the base station. The at least one other parameter may be an amount of error correction coding, a sub-period duration in the TDMA frame, a number of modulation symbols from a set of modulation symbols and/or a number of sub-periods of the TDMA frame.

32 Claims, 9 Drawing Sheets

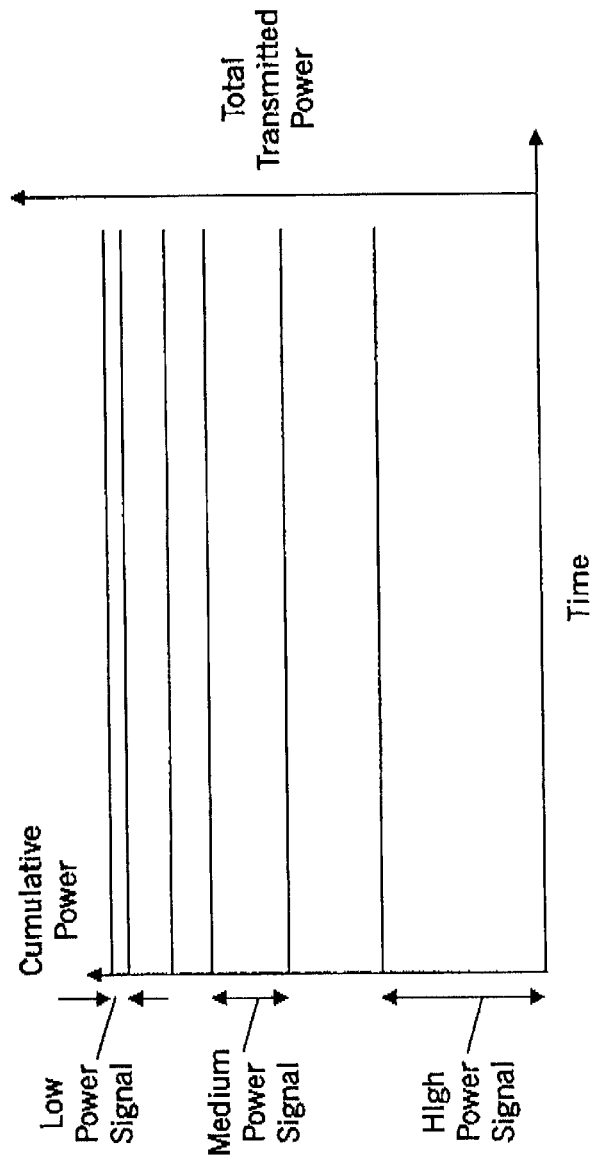
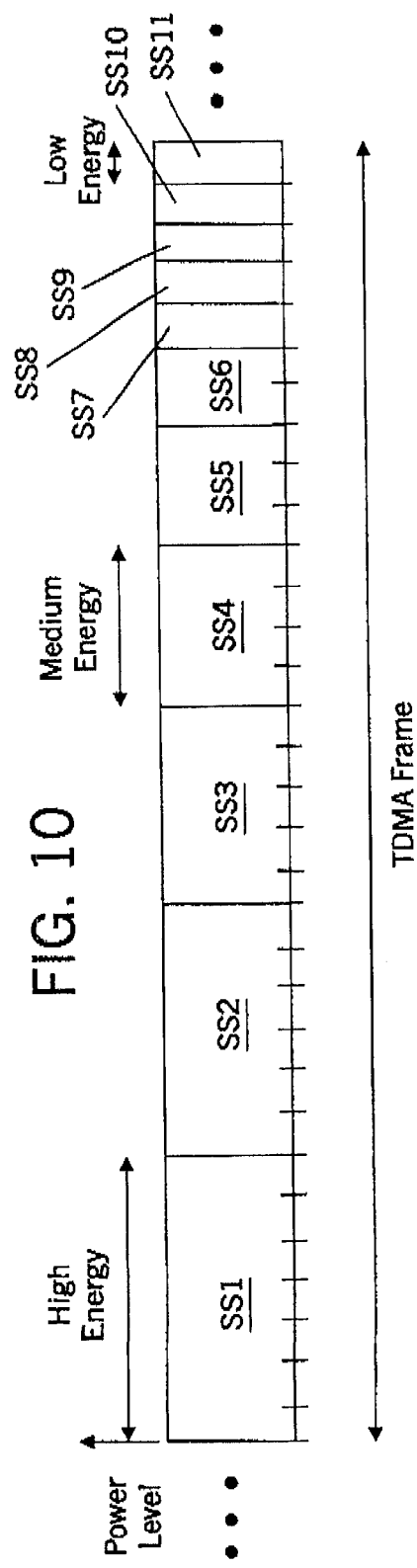
FIG. 5 PRIOR ART
FIG. 10

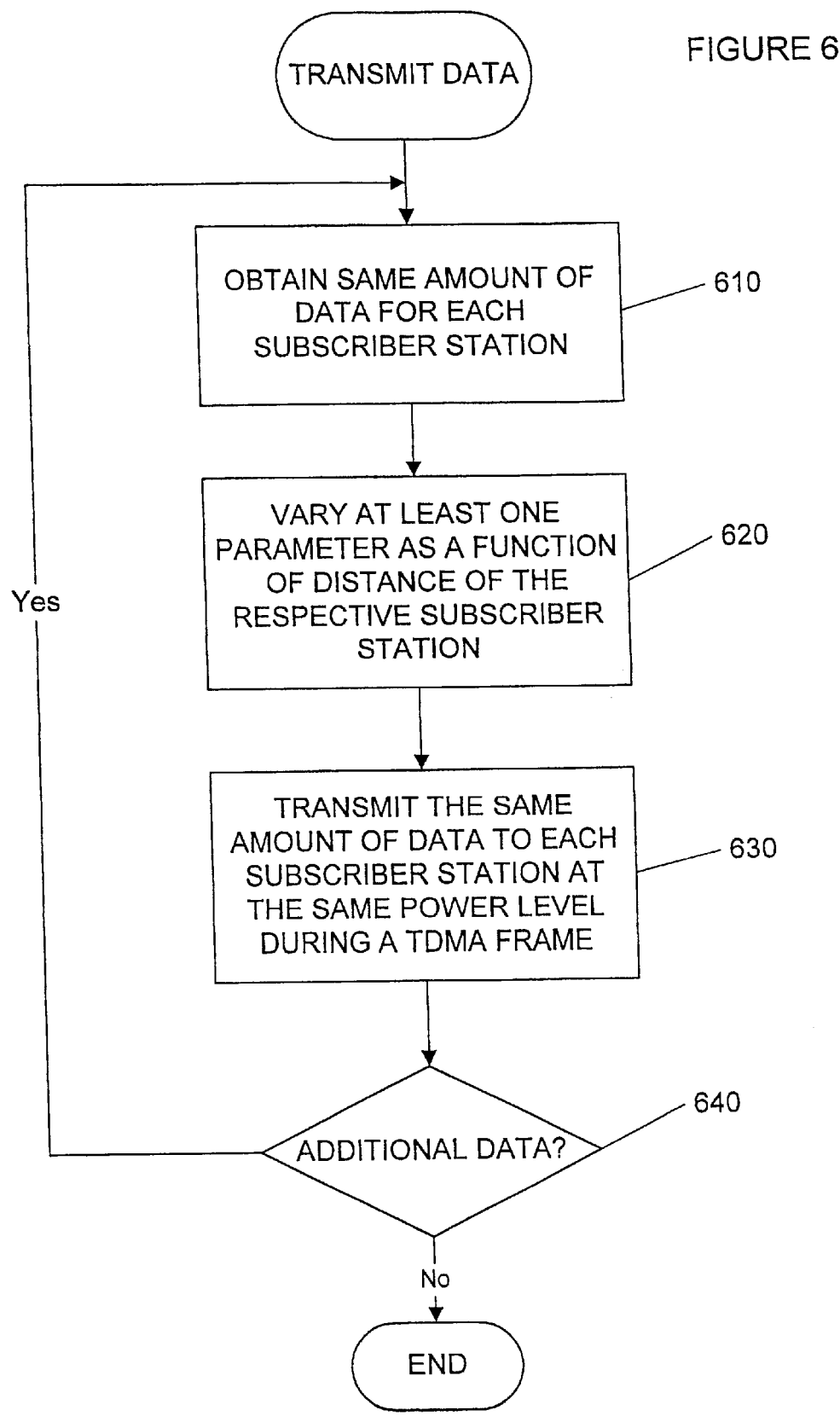

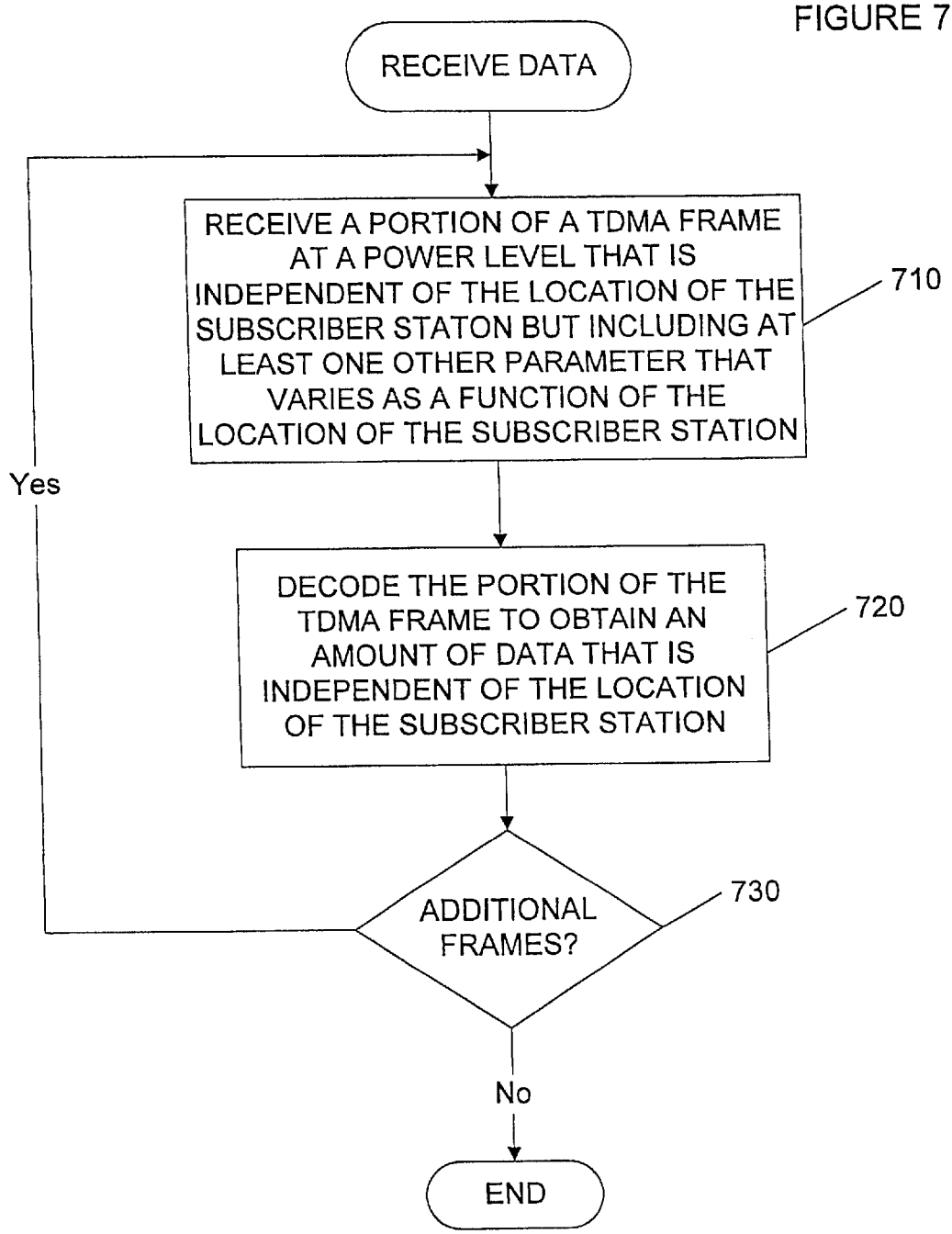

METHODS FOR WIRELESSLY COMMUNICATING TIME DIVISION MULTIPLE ACCESS (TDMA) DATA USING ADAPTIVE MULTIPLEXING AND CODING

BACKGROUND OF THE INVENTION

The present invention relates to communications methods and systems (apparatus), and more particularly to methods and systems for allocating resources in wireless communications.

Wireless communications systems are commonly employed to provide voice and/or data communications to subscriber stations. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more subscriber stations such as radiotelephones 22, communicating with a plurality of cells 24 served by base stations 26 and a Mobile Telephone Switching Office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and/or data information. Through the cellular network 20, a duplex radio communication link may be established between two radiotelephones 22 or between a radiotelephone 22 and a landline telephone user 32 through a Public Switched Telephone Network (PSTN) 34. The function of a base station 26 is to handle radio communication between a cell 24 and radiotelephones 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and subscriber stations such as satellite radiotelephones 23. The satellite conveys radiotelephone communications over duplex links 46 to satellite radiotelephones 23 and an earth station 44. The earth station 44 may in turn be connected to a PSTN 34, allowing communications between satellite radiotelephones, and communications between satellite radiotelephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. These access techniques include Frequency Division Multiple Access (FDMA) technology (e.g., the advanced mobile phone service (AMPS) standard); Time Division Multiple Access (TDMA) technology (e.g., the Telecommunication Industry Association (TIA)/Electronic Industries Association (EIA) 136 or digital AMPS (DAMPS) standard or the global system for mobile communication (GSM) standard); or Code Division Multiple Access (CDMA) technology (e.g., the TIA interim standard (IS) 95). The FDMA and TDMA technologies will be discussed in more detail hereafter.

Traditional analog cellular systems generally use FDMA to create communications channels. Radiotelephone communications signals are generally modulated waveforms that are communicated over predetermined frequency bands in a spectrum of carrier frequencies. In a typical FDMA system, each of these discrete frequency bands may serve as a channel over which cellular radiotelephones communicate with a base station or satellite serving a cell.

As the number of subscribers in a cellular radiotelephone system increases, the available frequency spectrum may need to be managed with greater efficiency to provide more channels while maintaining communications quality. This challenge may be further complicated because subscriber stations may not be uniformly distributed among cells in the system. More channels may be needed for particular cells to handle potentially higher local subscriber station densities at any given time. For example, a cell in an urban area might contain hundreds or thousands of subscriber stations at certain times, which may exhaust the number of channels available in the cell.

To provide service to increasing numbers of subscriber stations, conventional cellular systems may implement frequency reuse to increase channel capacity in each cell and increase spectral efficiency. More specifically, frequency bands may be allocated to each cell such that cells using the same frequencies are geographically separated to allow subscriber stations in different cells to use the same frequency simultaneously without interfering with each other. Accordingly, for example, many thousands of subscriber stations may be served by a system having only several hundred allocated frequency bands.

Another technology that may further increase channel capacity and spectral efficiency is TDMA. A TDMA system may be implemented by subdividing the frequency bands used in conventional FDMA systems into sequential time slots. Communication over a frequency band typically occurs via a repetitive TDMA frame structure wherein each frame includes a plurality of time slots, also referred to herein as sub-periods. Each subscriber station communicates with the base station using bursts of digital data transmitted during the subscriber station's assigned time slots.

A channel in a TDMA system may include at least one time slot on at least one frequency band, and typically includes at least one time slot in each of a plurality of frames. As discussed in the foregoing, channels may be used to communicate voice, data, and/or other information between users, e.g., between a subscriber station and a wireline telephone.

CDMA systems, such as those conforming to the IS-95 standard, can achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

The subscriber stations may include traditional radiotelephones or mobile terminals. These devices may include a serial data port in which a device, such as a computer or Personal Digital Assistant (PDA), may be connected to establish a wireless data connection. The subscriber stations also may include such wireless communications devices which are being used for voice calls, data calls, facsimile transfer, Internet access, paging, and other personal organization features such as calendar management or even travel directions via the Global Positioning System (GPS). These devices may include a cellular radiotelephone with a multi-line display, a Personal Communications System (PCS) terminal that may combine a cellular radiotelephone with data processing, facsimile and data communications capabilities, a PDA that can include a radiotelephone, pager, Interet/intranet access, Web browser, organizer, calendar and/or a GPS receiver, and conventional laptop and/or palmtop receivers that include radiotelephone transceivers. These devices also may be referred to as "pervasive computing" devices. As used herein, the term "subscriber stations" includes all of these radiotelephones, mobile terminals, wireless communicators, personal communications systems, pervasive computing devices and/or other fixed or mobile wireless communications receivers.

SUMMARY OF THE INVENTION

Embodiments of the present invention wirelessly transmit data from a base station, and/or wirelessly receive data at a plurality of subscriber stations that are at a plurality of distances from the base station using a Time Division Multiple Access (TDMA) frame by transmitting a same amount of data to each of the subscriber stations at a same power level during the TDMA frame while varying at least one other parameter as a function of the distance of the respective subscriber station from the base station. It will be understood that the term "function of distance" includes a function of propagation path loss as well. The at least one other parameter may be an amount of error correction coding, a sub-period duration in the TDMA frame, a number of modulation symbols from a set of modulation symbols and/or a number of sub-periods of the TDMA frame.

BRIEF DESCRIPTION OF THE DRAWINGS

FIG. 5 graphically illustrates overlapping CDMA signals of graduated power levels pursuant to U.S. Pat. No. 5,345, 598.

FIG. 6 is a flowchart of operations for transmitting data according to embodiments of the present invention.

FIG. 7 is a flowchart of operations for receiving data according to embodiments of the present invention.

FIG. 10 graphically illustrates time division multiplexing of data packets of different duration and/or coding according to embodiments of the invention.

DETAILED DESCRIPTION OF PREFERRED EMBODIMENTS

Figure 1:
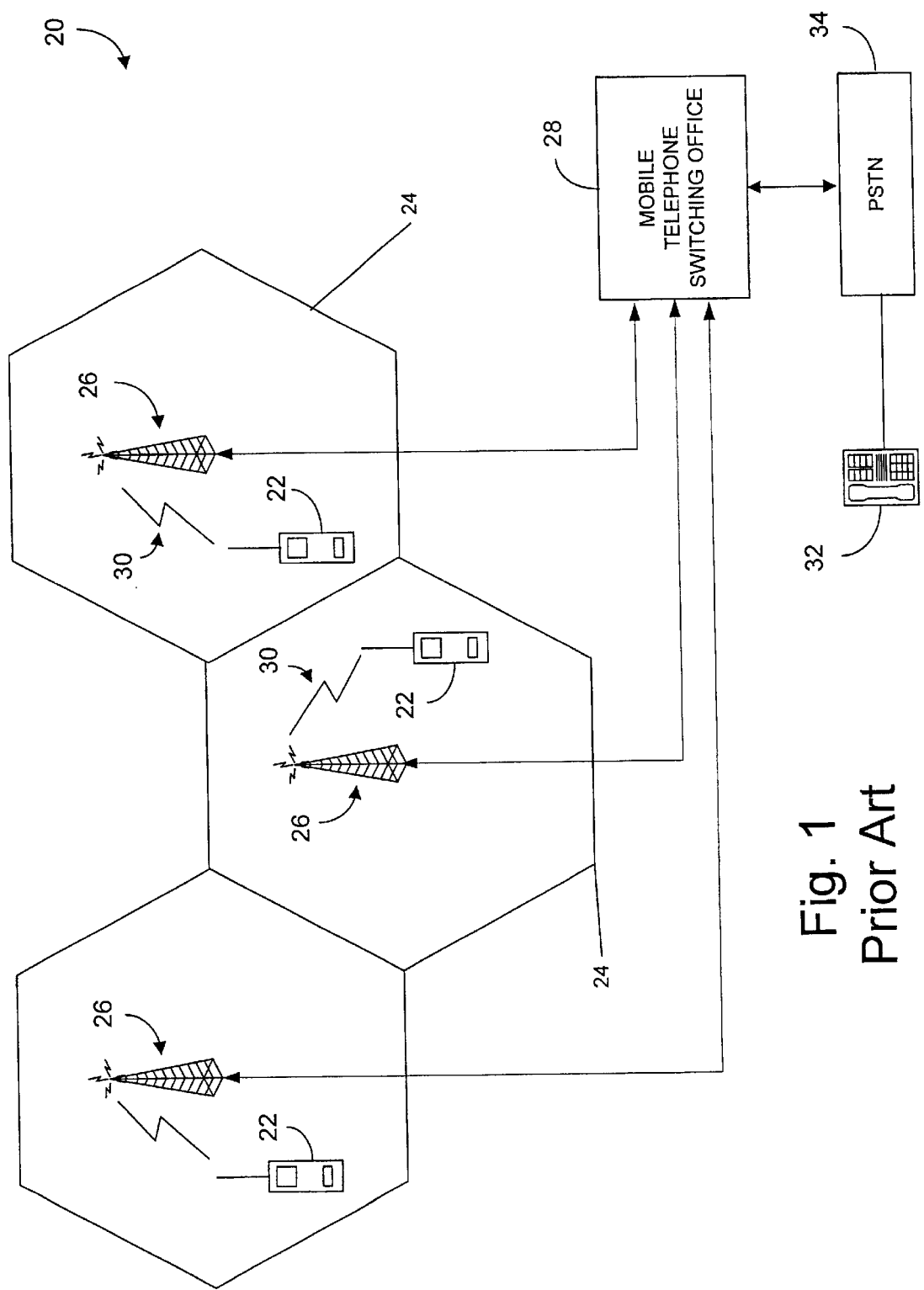
FIG. 1 is a schematic diagram illustrating a conventional terrestrial cellular communications system.
Figure 2:
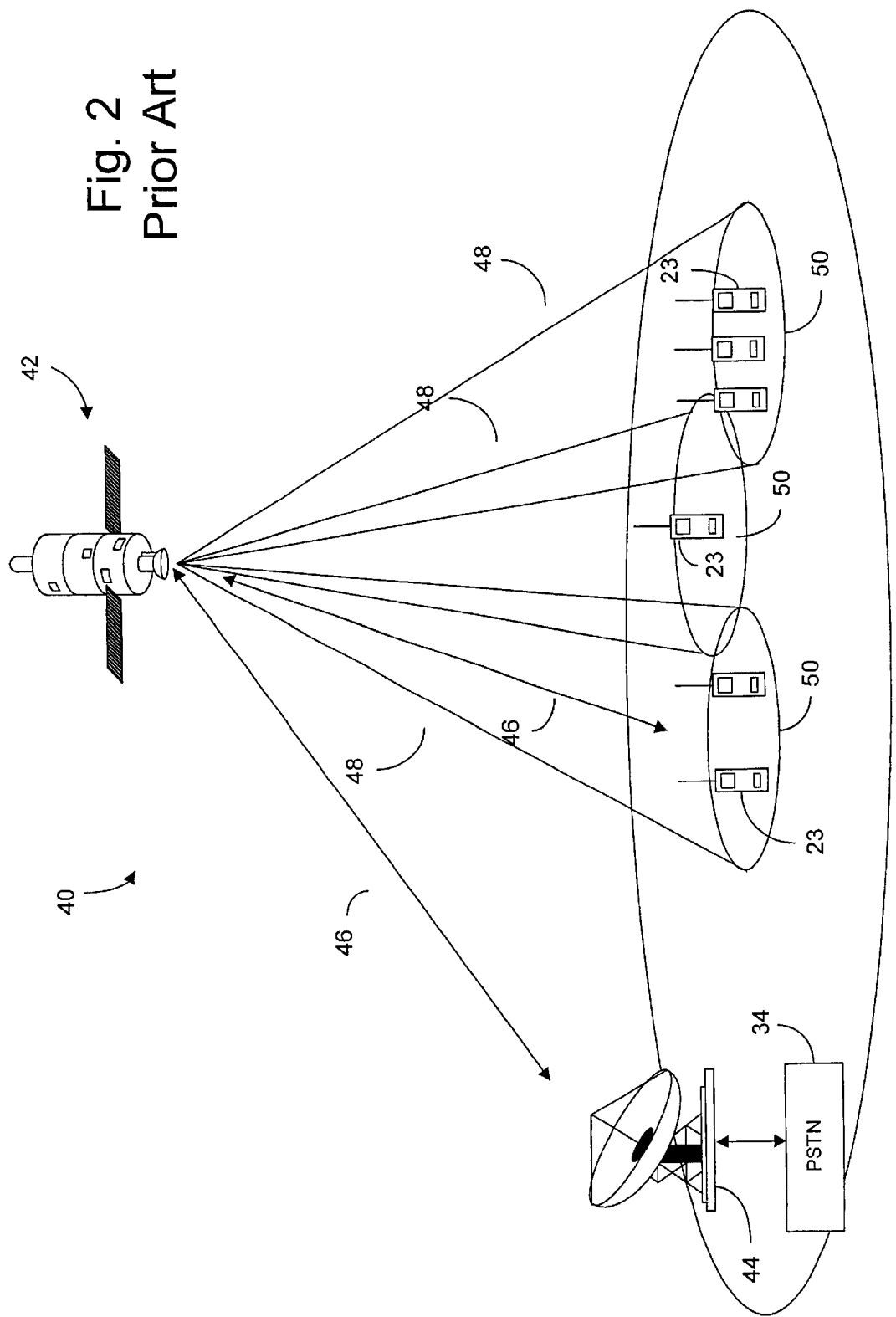
FIG. 2 is a schematic diagram illustrating a conventional satellite-based wireless communications system.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements.

Figure 3:
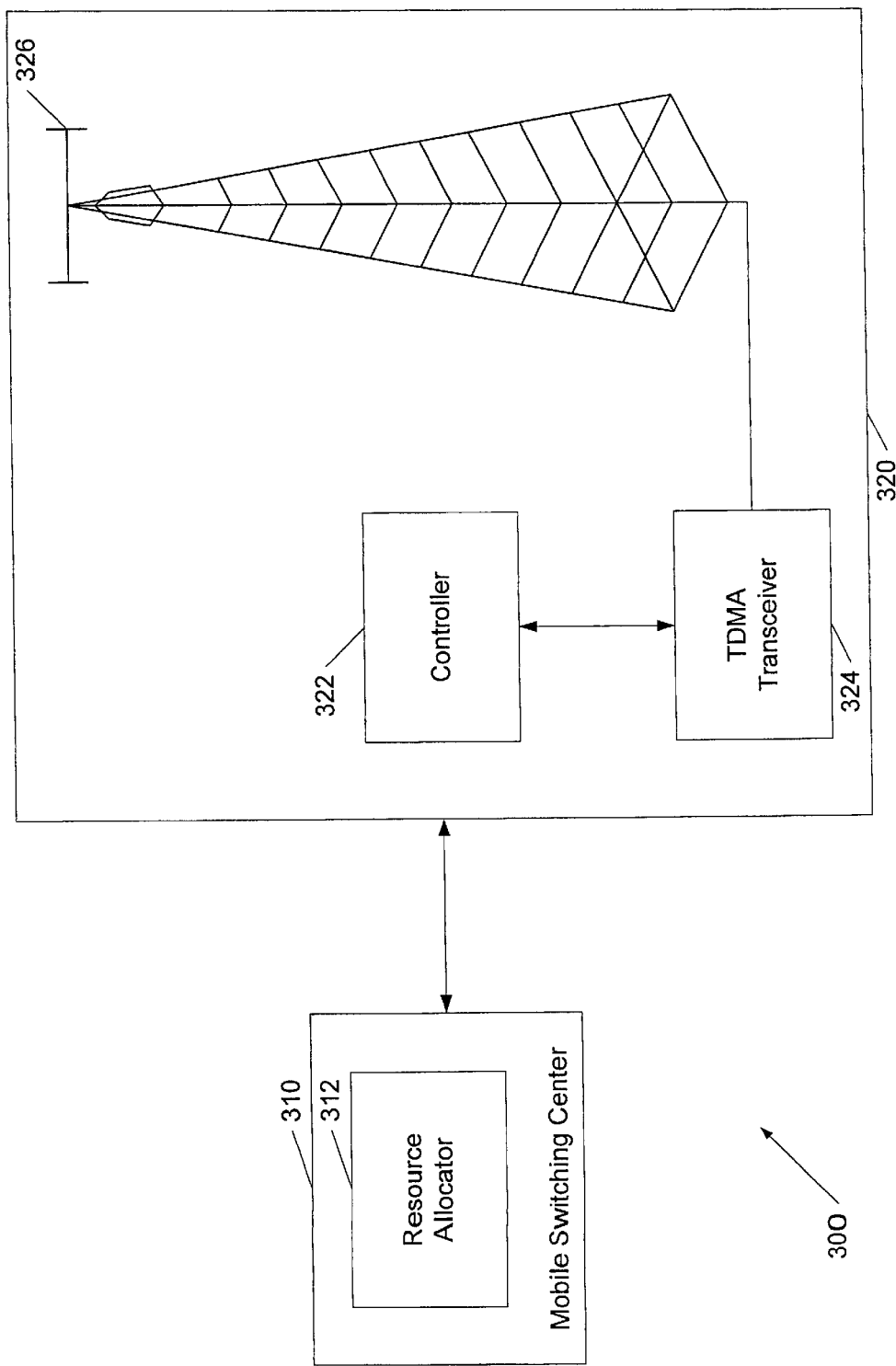
FIG. 3 is a schematic diagram illustrating an exemplary wireless communications system according to embodiments of the present invention.

Portions of a wireless communications system 300 in which the present invention may be embodied are illustrated in FIG. 3. The wireless communications system 300 includes a base station 320 and a resource allocator 312. The base station 320 includes an antenna 326, a TDMA transceiver 324, and a controller 322 that controls the operations of the transceiver 324. It will be appreciated that the base station 320 may include many other components, such as power supplies and other support equipment, and that the TDMA transceiver 324 may include various combinations of components such as mixers, demodulators, decoders, timing generators, and a variety of other communications components. The detailed operations of such components are known to those skilled in the art, and a detailed description thereof is not necessary to understanding of the present invention. It will be appreciated that, in general, functions of the base station 320 may be implemented using special-purpose hardware, software and/or firmware executing on special or general purpose computing system, or combinations thereof.

The resource allocator 312 is illustrated as implemented in a mobile switching center 310 coupled to the base station 320. The resource allocator 312 is operative to assign time slots, spreading codes, coding rates, and bandwidth to subscriber stations communicating with the base station 320 according to various aspects of the present invention described in greater detail herein. It will be appreciated that although the resource allocator 312 is here illustrated as implemented in the MSC 310, functions of the resource allocator 312 may be implemented in other communications system components, such as in the base station 320 and may, in general, be distributed among commonly-used components of a wireless communications system infrastructure. It will also be appreciated that the resource allocator 312 may be implemented using special-purpose hardware, software and/or firmware executing on special or general purpose computing system, or combinations thereof.

Figure 4:
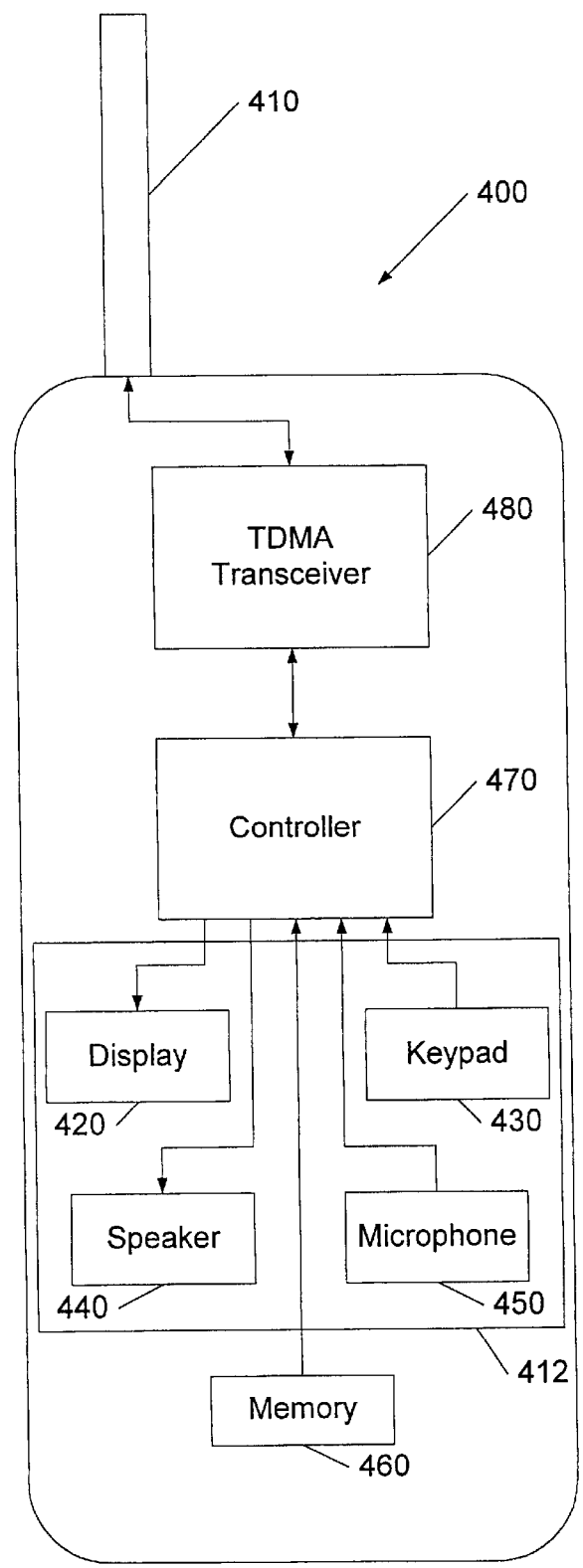
FIG. 4 is a schematic diagram illustrating an exemplary subscriber station according to embodiments of the present invention.

FIG. 4 illustrates a subscriber station 400 in which systems and methods according to the present invention may be embodied. The subscriber station 400 includes an antenna 410 for transmitting and receiving Radio Frequency (RF) signals. The subscriber station 400 also includes a user interface 412 including a display 420, a keypad 430, a speaker 440 and/or a microphone 450. The subscriber station 400 further includes a controller 470 that controls the operations of the user interface 412, and a TDMA transceiver 480 that is coupled to the antenna 410 and is controlled by the controller 470. The controller 470 is also operatively associated with a memory 460 of the subscriber station 400 that stores, for example, program instructions and data used by the controller 470. The TDMA transceiver 480 may include various combinations of components such as mixers, demodulators, decoders, timing generators, and a variety of other communications components. The controller 470 may include, for example, a microprocessor, microcontroller and/or other data processing device that is operative to load and execute computer instructions for performing functions described herein. It also will be understood that the functionality of the transceiver 480, the controller 470 and/or the memory 460 may be combined.

It is known to use varying power levels of sub-periods of a TDMA frame for various reasons. See, for example, U.S. Pat. No. 6,072,792 to Mazur et al. entitled Power Control Apparatus, and an Associated Method, for TDAM Transmitter, and U.S. Pat. No. 5,982,766 to Nystrom et al., entitled Power Control Method and System in a TDMA Radio Communication System, the disclosures of both of which are hereby incorporated herein by reference in their entirety. It also is known to transmit TDMA bursts using different bandwidths and burst durations as described in copending application Ser. No. 09/638,755 to the present inventor Dent entitled Communications Methods and Devices Providing Dynamic Allocations of Bandwidths and Burst Durations, the disclosure of which is hereby incorporated herein by reference in its entirety. It also is known to transmit CDMA signals at different power levels. See, for example, U.S. Pat. No. 5,345,598 to the present inventor Dent entitled Duplex Power Control System in a Communications Network, the disclosure of which is hereby incorporated herein by reference in its entirety. FIG. 5 graphically illustrates overlapping CDMA signals of graduated power level pursuant to U.S. Pat. No. 5,345,598.

Embodiments of the present invention wirelessly transmit data from a base station, and wirelessly receive data at a plurality of subscriber stations that are at a plurality of distances from the base station using a Time Division Multiple Access (TDMA) frame by transmitting a same amount of data to each of the subscriber stations at a same power level during the TDMA frame while varying at least one other parameter as a function of the distance of the respective subscriber station from the base station. As used herein, the term "function of distance" shall include a function of propagation path loss as well. The at least one other parameter may be at least one of an amount of error correction coding, a sub-period duration in the TDMA frame, a number of modulation symbols from a set of modulation symbols and a number of sub-periods of the TDMA frame. The function of distance may be a linear or nonlinear, monotonic or nonmonotonic, continuous or discontinuous function of distance.

According to other embodiments of the invention, base stations transmit a radio signal of a given signal spectral bandwidth due to modulation with a coded symbol stream. The coded symbol stream for each base station is formed by time-multiplexing coded symbol streams to be transmitted to subscriber stations it is currently serving, and which lie at different distances from the base station, to form a time-division-multiplex frame with a frame repetition period.

Data symbols for a subscriber station lying close to the base station and therefore receiving a strong signal with high signal-to-interference ratio may be coded into multi-level modulation symbols with little additional error-correction coding redundancy and therefore can occupy a small fraction of the TDMA frame period. In contrast, data symbols intended for a subscriber station at a larger distance from the base station and closer to a neighboring interfering station may be coded into modulation symbols having a fewer number of levels and/or may use a greater amount of error correction coding redundancy, thereby using a greater number of modulation symbols to convey the same amount of data and therefore occupying a greater proportion of the TDMA frame period.

Thus, embodiments of the invention allocate a different proportion of the TDMA transmission period to convey the same quantum of data, a data packet, to different subscriber stations as a function of their distance from the base station or more specifically according to the signal-to-noise-plus-interference ratio they are experiencing at their individual locations.

In some embodiments of the invention, all the coded modulation symbols for one subscriber station are transmitted in a clump followed by all the coded modulation symbols for the next subscriber, and so forth. Each subscriber station in these embodiments need only capture and decode in every TDMA frame period only the clump of coded modulation symbols assigned to the subscriber station.

In other embodiments, differently coded symbols for different subscriber stations may be interleaved while leaving the number of symbols per frame and the frame period unchanged as compared with the embodiments described in the immediately preceding paragraph. Thus, a given subscriber station may demodulate and/or decode symbols other than its own intended symbols in order to assist in demodulating and/or decoding its own intended symbols. In particular, a subscriber station lying at an intermediate distance from a base station may easily decode more heavily coded symbols intended for a more distant station and may use the decoded result to help with estimating the fading properties of the multipath propagation and/or with equalizing the received signal for multipath distortion.

Referring FIG. 6, operations for transmitting data by a base station according to embodiments present invention now will be described. It will be understood by those having skill in the art that these operations may be carried out by the resource allocator 312, controller 332 and/or TDMA transceiver 324 of FIG. 3.

Referring now to FIG. 6, at Block 610, a same amount of data may be obtained for each subscriber station. The same amount to data may be a same amount of bits to be transmitted. It also will be understood that the bits can represent digital data, audio, video, graphics and/or multimedia information. At Block 620, at least one parameter is varied as a function of the distance of the respective subscriber station. It will be understood that the function need not be varied in direct proportion to the distance as long as the parameter is varied as some function of distance of the respective subscriber station. Then, at Block 630, the same amount of data is transmitted to each subscriber station at the same power level during a TDMA frame.

At Block 640, if additional data is to be transmitted, the operations return to Block 610. If not, then the operations end.

Additional discussion of varying at least one parameter as a function of distance of the respective subscriber station now will be described. In some embodiments, the amount of error correction coding of the same amount of data to each of the subscriber stations is varied. In other embodiments, the TDMA frame comprises a plurality of sub-periods of varying duration and the sub-period duration is varied as a function, such as a fourth power function, of the distance of the respective subscriber station from the base station. In yet other embodiments, the sub-period duration and the amount of error correction coding both are varied. In yet other embodiments, the data is modulated based on a number of modulation symbols from a set of a modulation symbols and the number of modulation symbols from the set of modulation symbols is varied as a function, such as a power function, of the distance of the respective subscriber station from the base station. In still other embodiments, the number of modulation symbols and the amount of error correction coding of the data is varied as a function, such as a power function, of the distance of the respective subscriber station from the base station. In other embodiments, the TDMA frame comprises a plurality of sub-periods of same duration and the number of sub-periods is varied as a function, such as a power function, of the distance of the respective subscriber station from the base station. In still other embodiments, the number of sub-periods and the amount of error correction coding is varied. Additional discussion of each of these embodiments will be provided below.

Referring now to FIG. 7, operations to receive data according to embodiments of the invention are described. These operations may be carried out by the TDMA transceiver 480 and/or controller 470 of FIG. 4. As shown at Block 710, a portion of a TDMA frame is received at a power level that is independent of the location of the subscriber station relative to the base station, but including at least one other parameter that varies as a function of the location of the subscriber station relative to the base station. At Block 720, the portion of the TDMA frame is decoded to obtain an amount of data that is independent of the location of the subscriber station. If additional frames are received at Block 730, the operations at Block 710 repeat. If not, operations end. The parameter variation of Block 710 may include those that were described above in connection with Block 620, and need not be described again herein.

Figure 8:
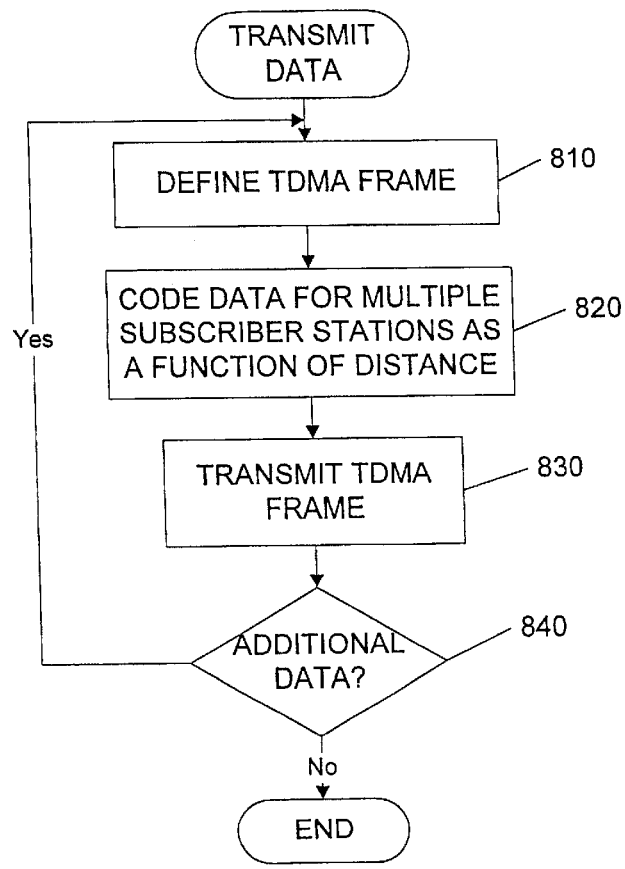
FIG. 8 is a flowchart of operations for transmitting data according to other embodiments of the present invention.

Referring now to FIG. 8, operations for transmitting data according to other embodiments of the invention are shown. As shown at Block 810, a TDMA frame and appropriate sub-periods are defined. At Block 820, data is coded for multiple subscriber stations in a manner that depends on the distance or path loss to the subscriber station from the base station. At Block 830, the TDMA frame is transmitted to the subscriber stations. At Block 840, if additional data is to be transmitted, operations at Block 810 are repeated. If not, operations end. It will be understood that these operations may be performed by the resource allocator 312, controller 322 and/or TDMA transceiver 324 of FIG. 3.

According to some embodiments of FIG. 8, at Block 810, the multiplexed time period is divided into sub-periods of graduated duration. At Block 820, data for transmission to a nearer subscriber station is coded to occupy a sub-period of shortest duration. Data for transmission to a furthest subscriber station is coded to occupy a sub-period of longest duration. Data for transmission to subscriber stations lying at intermediate distances is coded to occupy sub-periods of duration between the longest and the shortest sub-period of duration. The multiplexed time period including the coded data is wirelessly transmitted to the plurality of subscriber stations at Block 830.

In yet other embodiments of FIG. 8, a time division multiplexed frame period is defined in which a number M of modulation signals are transmitted, at Block 810. At Block 820, data is coded for transmission to a nearest subscriber station, to occupy a smallest subset M1 of the M modulation symbols. Data for transmission to a furthest subscriber station is coded to occupy a largest subset M2 of the M modulation symbols. Data for transmission to subscriber stations lying at intermediate distances is coded to occupy subsets of the M modulation symbols containing a number of symbols intermediate between the smallest and the largest subsets of the symbols. At Block 830, the time division multiplex frame including the coded data is wirelessly transmitted to the plurality of subscriber stations.

In yet other embodiments of FIG. 8, at Block 810, a time division multiplex frame period is divided into a number M of time slots, in each of which a number L of modulation symbols are transmitted. At Block 820, data is coded for transmission to a nearest subscriber station to occupy a smallest subset M1 of the M time slots. Data for transmission to a furthest subscriber station is coded to occupy a largest subset M2 of the M time slots. Data is coded for transmission to subscriber stations lying at intermediate distances to occupy subsets of the M time slots containing a number of time slots intermediate between the smallest and the largest subsets of slots. At Block 830, the time division multiplex frame period including the coded data is wirelessly transmitted to the plurality of subscriber stations.

Figure 9:
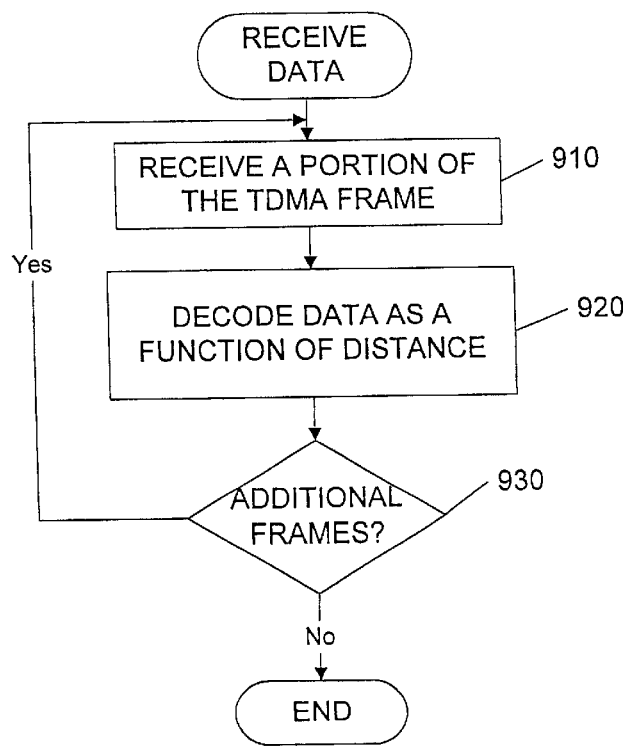
FIG. 9 is a flowchart of operations for receiving data according to other embodiments of the present invention.

Referring now to FIG. 9, operations for receiving data that is transmitted according to embodiments of FIG. 8 now will be described. These operations may be performed by the TDMA transceiver 480 and/or controller 470 of FIG. 4. As shown at Block 910, at least portion of a TDMA frame is received. At Block 920, the data is decoded as a function of the distance of the subscriber terminal from the base station. Decoding may be performed using a decoding scheme which is complementary to the appropriate coding scheme of Block 820. If additional frames are present at Block 930, the operations of Block 910 are performed again. If not, operations end.

FIG. 10 graphically illustrates time-division multiplexing of data packets of different duration and/or coding according to embodiments of the invention. A TDMA frame with 32 sub-periods, also referred to as time slots, is shown, wherein data packets are transmitted to eleven subscriber stations SS1–SS11. Packets intended for closer subscriber stations are transmitted at the same power level as packets intended for more distant subscriber stations, but occupy a shorter time duration and therefore consume proportionally less energy from the transmitter, as energy is equal to power times time. In conventional CDMA, an expectation was that reducing the power transmitted to nearer subscriber stations would allow more subscriber stations to be accommodated within the transmitter power budget and interference budget. However, this expectation may only be partly fulfilled. In contrast, in embodiments of the invention, reducing the time duration of transmissions to closer subscriber stations can allow more subscriber stations to be accommodated within a given TDMA frame repetition period. This potential advantage need not be reduced by own-cell interference, as different signals in the same cell generally do not overlap in time.

Figure 11:
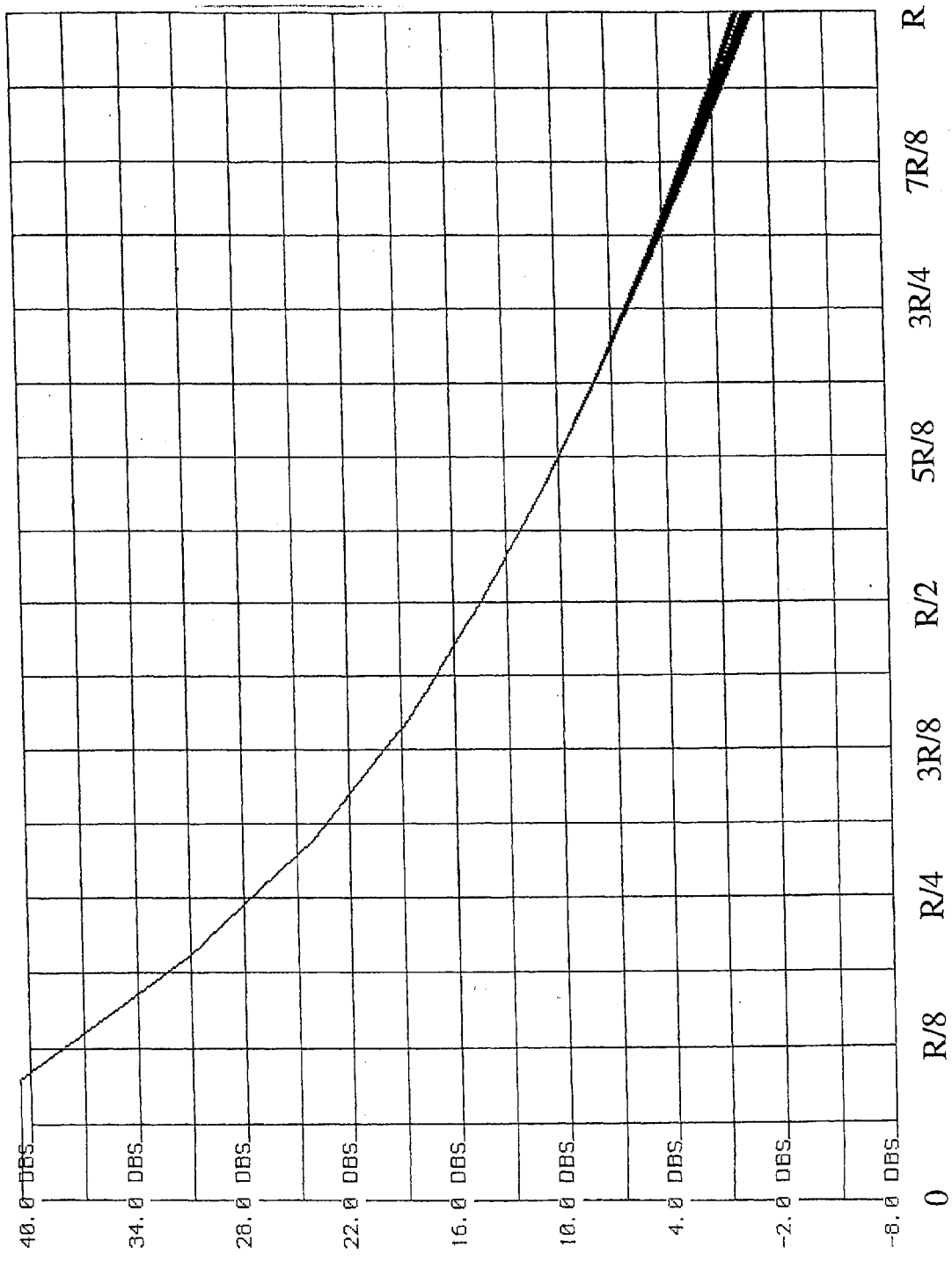
FIG. 11 graphically illustrates signal-to-interference ratio (C/I) versus distance (R) from a base station to a cell center.

FIG. 11 graphically illustrates signal-to-interference ratio (C/I) versus distance (R) from a base station at the cell center. The spread of values at the cell edge represents different angular positions in the cell. Angular position may be irrelevant to the C/I when the subscriber station is closer to the cell center, however.

It may be seen from FIG. 11 that the C/I experienced by a subscriber station, with all other cells in the system transmitting on the same frequency at the same power level, varies from about −1 dB at the cell edge to over 40 dB at less than ⅛th cell radius from the center. Consequently, embodiments of the invention ideally can allocate less than ¹⁄₁₀₀₀₀th of the time for transmitting to a subscriber station at radius less than R/8 compared to the time allocated to transmit to a subscriber station at radius R, a subscriber station at radius R/4 about ¹⁄₁₀₀₀th of the time, a subscriber station at R/2 about ⅕₀th of the time, and so forth, where the sum of the times over all subscriber stations is equal to a frame repetition period.

Another factor that may be taken into account is the geographic distribution of subscriber stations. With a uniform area distribution, the number of subscriber stations at a given radius increases in proportion to the area of a ring at that radius, which increases proportionally to radius. Thus the number of subscriber stations situated in the vicinity of R/8 is one eighth of the number of subscriber stations situated near cell edge. One way to generate a representative distribution of this type is to place one subscriber station in each of a number of rings of successively increasing radius and having the same "unit" area. If it is desired to multiplex, for example, 16 different subscriber stations in to the same TDMA frame period, then there would be 16 such rings of radii r1, r2, r3 ... r16 that obey the equal-area annulus laws:

$$r1^2 = r2^2 - r1^2 = r3^2 - r2^2 \ldots \text{etc.}$$

from which $r2 = \sqrt{2} \cdot r1$ $r3 = \sqrt{3} \cdot r1$ $r4 = \sqrt{4} \cdot r1$

...

$r16 = \sqrt{16} \cdot r1 = R$, therefore $r1 = R/4$

From the plot of C/I versus radius, the C/I for each of these terminal positions may be obtained as shown in Table 1:

TABLE 1

| Subscriber Station Position | C/I | Percentage of TDMA Frame Needed |
|---|---|---|
| r1 | 27 dB | 0.033% |
| r2 | 21 dB | 0.14% |
| r3 | 17 dB | 0.33% |
| r4 | 14 dB | 0.63% |
| r5 | 12 dB | 1.04% |
| r6 | 10 dB | 1.58% |
| r7 | 8.5 dB | 2.28% |
| r8 | 7.5 dB | 3.17% |
| r9 | 6 dB | 4.26% |
| r10 | 5 dB | 5.6% |
| r11 | 4 dB | 7.22% |
| r12 | 2.5 dB | 9.17% |
| r13 | 1.5 dB | 11.49% |
| r14 | 0.5 dB | 14.24% |
| r15 | −0.5 dB | 17.49% |
| r16 | −1.5 dB | 21.32% |

In Table 1, the percentage of the frame period to assign the correct proportion of transmitter energy to each subscriber station is shown, and may be compared with 6.67% (¹⁄₁₆th) that would be assigned if all subscriber stations received an equal proportion. From this, the increase in capacity or per-subscriber station data rate using embodiments of the invention may be determined. Instead of receiving 6.67% of the frame period, the subscriber station at r16 receives 21.32%, over three times as much. Thus the subscriber station is able to receive three times as much data per frame period than with an equal distribution of frame time to the subscriber stations.

A practical design of such a system may assign frame time to subscriber stations in discrete quanta or time slots using a discontinuous function of distance. However, a TDMA system can also be constructed in which the total number of symbols in a frame period is divided in roughly the above-tabulated percentages between different subscriber stations.

One exemplary system could comprise dividing the frame period into 32 slots each containing 120 data symbols plus other fixed symbols such as syncwords to assist demodulation and equalization for multipath propagation. The total of 3840 data symbols may be divided between a number of subscriber stations in the proportions shown in Table 2. Two subscriber stations are sacrificed because of the quantization.

TABLE 2

| Subscriber Station Position | Number of Symbols |
|---|---|
| r16 | 818 symbols |
| r15 | 671 symbols |
| r14 | 546 symbols |
| r13 | 441 symbols |
| r12 | 352 symbols |
| r11 | 277 symbols |
| r10 | 215 symbols |
| r9 | 163 symbols |
| r8 | 121 symbols |
| r7 | 87 symbols |
| r6 | 60 symbols |
| r5 | 39 symbols |
| r4 | 26 symbols |
| r3 | 24 symbols |

In embodiments of the invention, data is encoded and modulated such that each subscriber station decodes the same amount of data, substantially error free. For r3, the C/I is 17 dB and at this value a high order signal constellation such as 16-PSK or 16 QAM may be used, conveying four bits per symbol. Thus 96 bits are transmitted including error correction coding. A minimum of error correction coding may be used, for example a rate ⅚ths code, which results in decoding 80 information bits from the 96 bits. Using the same modulation, 104 bits are received at r4 and may be decoded with a rate 80/104=10/13 code to yield 80 bits, the greater coding redundancy compensating for the lower C/I of 14 dB.

Codes of the exact desired coding rates such as 80/(4×39), for r5 may be produced by starting with a rational code such as rate ⅓rd, and puncturing it to delete bits from the decoder output until the desired number of transmitted symbols is obtained.

At the larger distances, such as r16 (cell edge), it may not be desirable to transmit higher order modulation such as 16 QAM, but rather to transmit binary modulation and to use a rate 80/818 error correction code. Such a code can, for example, comprise transmitting five repeats of each symbol, which when combined raise the C/I by 7 dB to +5.5 dB, and using a rate 400/818 or approximately rate ½ code.

It will be understood that the symbols assigned to a particular subscriber station need not be sequentially transmitted. Rather, symbols may be interleaved in a predetermined fashion to provide time-diversity and some potential benefit in fading situations, which may be determined by simulation as is well known to one skilled in the art. Therefore the choice of interleaving or no interleaving may be based on particular applications and fading situations, which may depend on radio frequency band, speed of mobile subscriber stations, propagation path and terrain, etc.

When some modulation symbols belong to a higher order constellation such as 16-QAM and others belong to a lower order constellation such as QPSK or OQPSK, the present inventor has pointed out in U.S. patent application Ser. No. 09/066,669 filed Apr. 28, 1998 and entitled "Transmitter/Receiver for GMSK and Offset-QAM", the disclosure of which is hereby incorporated herein by reference, that the lower order constellation can be defined as containing a subset of the constellation points of the higher order constellation such that both may be transmitted using the same transmitter by feeding in an appropriate modulation bit pattern. Both also may be received using the same subscriber station by constraining the subscriber station to detect only symbols within the applicable subset of constellation points.

Thus, 14 subscriber stations can each receive the same 80 decoded bits per frame. If the frame had by contrast been divided into 14 equal time slots each conveying approximately 274 symbols, and the same coding rate of approximately 1/10 had been used as for r16 as above in order to operate at his −1.5 dB C/I, then the data rate would have been only 27 bits per frame instead of 80, illustrating a potential factor of three improvement.

In packet data systems, it may not be desired to design codes to ensure very high probabilities of error free packet reception. Rather, codes may be designed for perhaps 90% packet success rate, and to employ acknowledgment and automatic request for retransmission (ARQ). In that way, the average data rate may be increased further. Moreover, every subscriber station need not receive exactly the same data rate all the time. Subscriber stations in favorable situations can be offered higher data rates so as to complete data transfers with reduced delay, so that they can vacate the channel earlier and the capacity released can be offered to another subscriber station, thereby allowing capacity to increase.

In other embodiments, 32 time slots can be divided between 11 subscriber stations as shown in Table 3:

TABLE 3

| Subscriber Station Position | Number of Slots and Coding |
|---|---|
| r16: | 7 slots, using 7 repeats of 8-psk symbols and rate 1/3rd coding |
| r15: | 6 slots, using 6 repeats of 8-psk symbols and rate 1/3rd coding |
| r14: | 5 slots, using 5 repeats of 8-psk symbols and rate 1/3rd coding |
| r13 | 4 slots, using 4 repeats of 8-psk symbols and rate 1/3rd coding |
| r12 | 3 slots, using 3 repeats of 8-psk symbols and rate 1/3rd coding |
| r11 | 2 slots, using 2 repeats of 8-psk symbols and rate 1/3rd coding |
| r10 | 1 slot using 8-psk symbols and rate 1/3rd coding |
| r9 | 1 slot using 8-psk symbols and rate 1/3rd coding |
| r8 | 1 slot using 8-psk symbols and rate 1/3rd coding |
| r7 | 1 slot using 8-psk symbols and rate 1/3rd coding |
| r6 | 1 slot using 8-psk symbols and rate 1/3rd coding |

With 120 8-PSK data symbols per slot and rate 1/3rd coding, each of the above 11 subscriber stations can decode 120 data bits per TDMA frame period substantially error free. The number of slot repeats for each adapts the performance to their respective C/I ratios. Subscriber stations in more favorable positions may reduce the coding rate to receive higher data rates.

Mobile data systems also may be characterized by a very dynamic demand, where a subscriber station requests data at a random time, is queued for service, receives the data, and then the channel is allocated to the next subscriber station in the queue. Thus the division of a frame period into various numbers of symbols or slots destined for different subscriber stations may change from frame to frame. A subscriber station may attempt to decode all data to determine if it is addressed to the subscriber station, and discard that which is not.

Alternatively the frame can use specific symbols at the beginning, coded heavily enough so that all subscriber stations at all ranges can decode them, to indicate what fraction of the frame is allocated to each subscriber station. This may be simplified if there are only a finite number of ways, numbered 1 to 16 for example, in which the frame symbols can be divided between subscriber stations, each with a predetermined code and/or interleaving pattern. Then, a four-bit number linked to each subscriber station address may be transmitted to indicate the division it will receive in this frame or a subsequent frame. The network may determine the division that the subscriber station will receive based, for example, on a C/I report that the subscriber station transmits with a request for data or acknowledgment of previously received data. The network may maintain a separate queue for requests that could be fulfilled by each of the exemplary 16 ways of dividing the frame. A request could be fulfilled either when a free space became available at the head of the respective queue or a lower C/I queue, so that each request may be fulfilled in the most timely fashion and with at least adequate coding.

The principles outlined above may be adapted by one skilled in the art to design systems and methods that fulfill requests for varying data rates by allocating different proportions of the transmitted frame time to different subscriber stations as a function of the requested rate and the subscriber station's C/I. Multiple radio frequency channels may also be operated from the same transmitting station, and requests may be fulfilled by assigning both a channel frequency and a division of the frame symbols to a subscriber station in a channel assignment message such as disclosed above.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of wirelessly transmitting data from a base station to a plurality of subscriber stations, comprising:

dividing a multiplex time period into sub-periods of graduated duration;

coding data for transmission to a nearest subscriber station to occupy a sub-period of shortest duration;

coding data for transmission to a farthest subscriber station to occupy a sub-period of longest duration;

coding data for transmission to subscriber stations lying at intermediate distances to occupy sub-periods of duration between the longest and the shortest sub-period duration; and wirelessly transmitting the multiplex time period including the coded data from the base station to the plurality of subscriber stations.

2. The method of claim 1 in which a same amount of data is coded into each sub-period and the coding is varied as a function of the sub-period duration.

3. The method of claim 1 in which the coded data is transmitted at the same modulation symbol rate for each of the sub-periods.

4. The method of claim 3 in which the modulation symbol rate comprises a succession of modulation symbols, each symbol representing a number N of coded data bits using a signal constellation of two to the power N signal points.

5. The method of claim 4 in which the number N of bits represented by each of the modulation symbols varies as a function of the duration of the sub-periods.

6. The method of claim 5 in which the sub-period of the shortest duration uses modulation symbols from a constellation with a highest value of N and the sub-period of the longest duration uses symbols from a constellation with a lowest value of N.

7. The method of claim 6 in which the highest value of N is three and the lowest value is one.

8. The method of claim 4 in which each of the data signals is coded using a rate K/NM code, where M is the number of modulation symbols in a sub-period and K is the number of data bits to be transmitted in a sub-period.

9. A method of claim 1 wherein the multiplex time period is a Time Division Multiple Access (TDMA) frame that is repeatedly transmitted from the base station to the plurality of subscriber stations.

10. A method of claim 1 wherein the multiplex time period including the coded data is transmitted at a constant power level.

11. A method of wirelessly transmitting data from a base station to a plurality of subscriber stations, comprising:
defining a time division multiplex frame period in which a number M of modulation symbols are transmitted;
coding data for transmission to a nearest subscriber station to occupy a smallest subset M1 of the M modulation symbols;
coding data for transmission to a farthest subscriber station to occupy a largest subset M2 of the M modulation symbols,
coding data for transmission to subscriber stations lying at intermediate distances to occupy subsets of the M modulation symbols containing a number of symbols intermediate between the smallest and the largest subsets of symbols; and
wirelessly transmitting the time division multiplex frame period including the coded data from the base station to the plurality of subscriber stations.

12. The method of claim 11 in which a same quantity of data bits is coded into each subset of modulation symbols and the coding is varied as a function of the number of modulation symbols in the subset.

13. The method of claim 12 in which the modulation symbols comprise a succession of modulation symbols, each symbol representing a number N of coded data bits using a signal constellation of two to the power N signal points.

14. The method of claim 13 in which the number N of bits represented by each of the modulation symbols varies as a function of the subset of symbols to which it belongs.

15. The method of claim 14 in which signal constellation points used to represent a smaller number of bits are a subset of the signal constellation points used to represent a greater number of bits.

16. The method of claim 13 in which each of the data bits is coded using a rate K/NM code, where K is the number of data bits to be transmitted to a subscriber station during the time division multiple frame period.

17. The method of claim 11 in which the symbols belonging to a same subset are transmitted sequentially.

18. The method of claim 11 in which modulation symbols of different subsets are interleaved over the time division multiplex frame period using a predetermined symbol placement pattern for each subset.

19. The method of claim 18 further comprising:
interleaving modulation symbols with known synchronization or pilot symbols.

20. A method of claim 11 wherein the multiplex time period is a Time Division Multiple Access (TDMA) frame that is repeatedly transmitted from the base station to the plurality of subscriber stations.

21. A method of claim 11 wherein the-multiplex time period including the coded data is transmitted at a constant power level.

22. A method of wirelessly transmitting data from a base station to a plurality of subscriber stations, comprising:
dividing a time division multiplex frame period into a number M of time slots in each of which a number L of modulation symbols are transmitted;
coding data for transmission to a nearest subscriber station to occupy a smallest subset M1 of the M time slots;
coding data for transmission to a farthest subscriber station to occupy a largest subset M2 of the M time slots;
coding data for transmission to subscriber stations lying at intermediate distances to occupy subsets of the M time slots containing a number of time slots intermediate between the smallest and the largest subsets of slots; and
wirelessly transmitting the time division multiplex frame period including the coded data from the base station to the plurality of subscriber stations.

23. The method of claim 22 in which a same quantity of data bits is coded into each subset of time slots and the coding is varied as a function of the number of time slots in the subset.

24. The method of claim 23 in which the number L of symbols in each time slot each represents a number N of coded data bits using a signal constellation of two to the power N signal points.

25. The method of claim 24 in which the number N of bits represented by each of the modulation symbols varies as a function of the subset of slots in which it is contained.

26. The method of claim 25 in which signal constellation points used to represent a smaller number of bits are a subset of the signal constellation points used to represent a greater number of bits.

27. The method of claim 24 in which each of the data bits is coded using a rate K/LMN code, where L is the number of time slots in the assigned subset of slots, N is the number of bits carried by each modulation symbol and K is the number of data bits to be transmitted using the assigned subset of slots.

28. The method of claim 27 in which the rate K/LMN code is formed by puncturing a code of lower rate having smaller integers in the numerator and denominator.

29. The method of claim 22 further comprising:
interspersing synchronization or pilot symbols among the modulation symbols of each of the time slots.

30. The method of claim 22 further including interspersing a plurality of synchronization or pilot symbols among the modulation symbols of each of the time slots.

31. A method of claim 22 wherein the multiplex time period is a Time Division Multiple Access (TDMA) frame that is repeatedly transmitted from the base station to the plurality of subscriber stations.

32. A method of claim 22 wherein the multiplex time period including the coded data is transmitted at a constant power level.

* * * * *